(12) United States Patent
Tao et al.

(10) Patent No.: US 8,218,523 B2
(45) Date of Patent: *Jul. 10, 2012

(54) COOPERATIVE ULTRA-RELIABLE WIRELESS COMMUNICATIONS

(75) Inventors: Zhifeng Tao, Allston, MA (US); Philip V. Orlik, Cambridge, MA (US); Zafer Sahinoglu, Arlington, MA (US); Andreas F. Molisch, Pasadena, CA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 522 days.

This patent is subject to a terminal disclaimer.

(21) Appl. No.: 12/419,874

(22) Filed: Apr. 7, 2009

(65) Prior Publication Data
US 2010/0254369 A1 Oct. 7, 2010

(51) Int. Cl.
*H04J 3/16* (2006.01)
(52) U.S. Cl. ......... 370/346; 370/208; 370/337; 714/748
(58) Field of Classification Search .................. 714/748
See application file for complete search history.

(56) References Cited

U.S. PATENT DOCUMENTS

| 6,999,519 | B2* | 2/2006 | Davies ............... | 375/259 |
| 7,031,294 | B2* | 4/2006 | Aiello et al. ........... | 370/348 |
| 2009/0196163 | A1* | 8/2009 | Du .................. | 370/204 |
| 2009/0238293 | A1* | 9/2009 | Bhatti et al. ........... | 375/260 |

FOREIGN PATENT DOCUMENTS

| WO | 2005015812 A1 | 2/2005 |
| WO | 2005227698 A1 | 10/2005 |
| WO | 2006022876 A1 | 3/2006 |
| WO | 2007148933 A1 | 12/2007 |

* cited by examiner

*Primary Examiner* — Duc C Ho
(74) *Attorney, Agent, or Firm* — Dirk Brinkman; Gene Vinokur

(57) ABSTRACT

A network includes a master node (master) and a set of slave nodes (slaves). The network uses orthogonal frequency-division multiplexing (OFDM) and time division multiple access (TDMA) symbols on sub-carriers. During a first downlink transmission from the master to the set of slaves using downlinks and all of the sub-carriers, a broadcast polling packet including data packets for each slave and sub-carrier assignments for the slaves is broadcast. Each slave transmits simultaneously to the master using uplinks and the assigned sub-carriers, a first response packet after receiving the broadcast polling packet. The master then broadcasts using the downlinks and all of the sub-carriers, a group acknowledgement packet, wherein the broadcast polling packet, the response packet, and the group acknowledgement packet include one superframe in one communication cycle, and wherein the broadcasting on the downlinks and the transmitting on the uplinks are disjoint in time.

14 Claims, 3 Drawing Sheets

No newline at end of file
COOPERATIVE ULTRA-RELIABLE WIRELESS COMMUNICATIONS

RELATED APPLICATION

This application is related to MERL-2043, U.S. Non-Provisional patent application 12/347,087, "OFDMA Based Medium Access Control and Frame Structure Design for Industrial Applications," filed by Bhatti et al. on Dec. 31, 2008, incorporated herein by reference.

FIELD OF THE INVENTION

This invention is related in general to wireless networks, and in particular to a cooperative ultra-reliable wireless network.

BACKGROUND OF THE INVENTION

Orthogonal frequency-division multiplexing OFDM uses discrete multi-tone modulation. With OFDM, the tones are modulated on a large number of evenly spaced subcarriers using some m-ary of quadrature amplitude modulation (QAM) or phase shift keying (PSK). For example, OFDM allows only one transceiver on a channel at any given time. To accommodate multiple transceivers (nodes), an OFDM network must use time division multiple access (TDMA), or frequency division multiple access (FDMA).

Orthogonal frequency-division multiplexing access (OFDMA) allows multiple transceiver to concurrently access the same channel, where a channel includes a group of evenly spaced subcarriers. OFDMA distributes subcarriers among the transceiver so multiple transceiver can transmit and receive on the same single radio frequency (RF) channel using time division multiplexing (TDD), or different RF channel using frequency division multiplexing (FDD) on multiple subchannels. The subchannels are further partitioned into groups of narrowband "tones." Typically, the number of tone in a subchannel is dependent on the total bandwidth of the subchannel.

A conventional star network includes one master node (master) and multiple slave nodes (slaves). The master communicates with all the slave nodes, and the slave nodes only communicate with the master nodes. Such networks can use OFDMA and TDD for channel access In applications that require high reliability with relatively low latency, such as factory automation, data from all the slaves need to be retrieved within a latency constraint. The latency constraint is called a communication cycle.

The related application describes an OFDMA based medium access control mechanism and the corresponding frame structure design for these industry applications that have stringent latency and reliability requirements.

According to the related application, in case when transmission from a slave node fails, that particular slave should be given a retransmission opportunity to meet the required transmission reliability without violating the latency constraint. However, if the channel between the master and the particular slave is in deep fade, the retransmission may have high probability to fail again. To address this issue, a cooperative scheme can be used to further improve reliability and latency performance.

SUMMARY OF THE INVENTION

A network includes a master node (master) and a set of slave nodes (slaves). The network uses orthogonal frequency-division multiplexing (OFDM) and time division multiple access (TDMA) symbols on sub-carriers.

During a first downlink transmission from the master to the set of slaves using downlinks and all of the sub-carriers, a broadcast polling packet including data packets for each slave and sub-carrier assignments for the slaves is broadcast.

Each slave transmits simultaneously to the master using uplinks and the assigned sub-carriers, a first response packet after receiving the broadcast polling packet.

The master then broadcasts using the downlinks and all of the sub-carriers, a group acknowledgement packet, wherein the broadcast polling packet, the response packet, and the group acknowledgement packet include one superframe in one communication cycle, and wherein the broadcasting on the downlinks and the transmitting on the uplinks are disjoint in time.

DETAILED DESCRIPTION OF THE PREFERRED EMBODIMENTS

Figure 1:
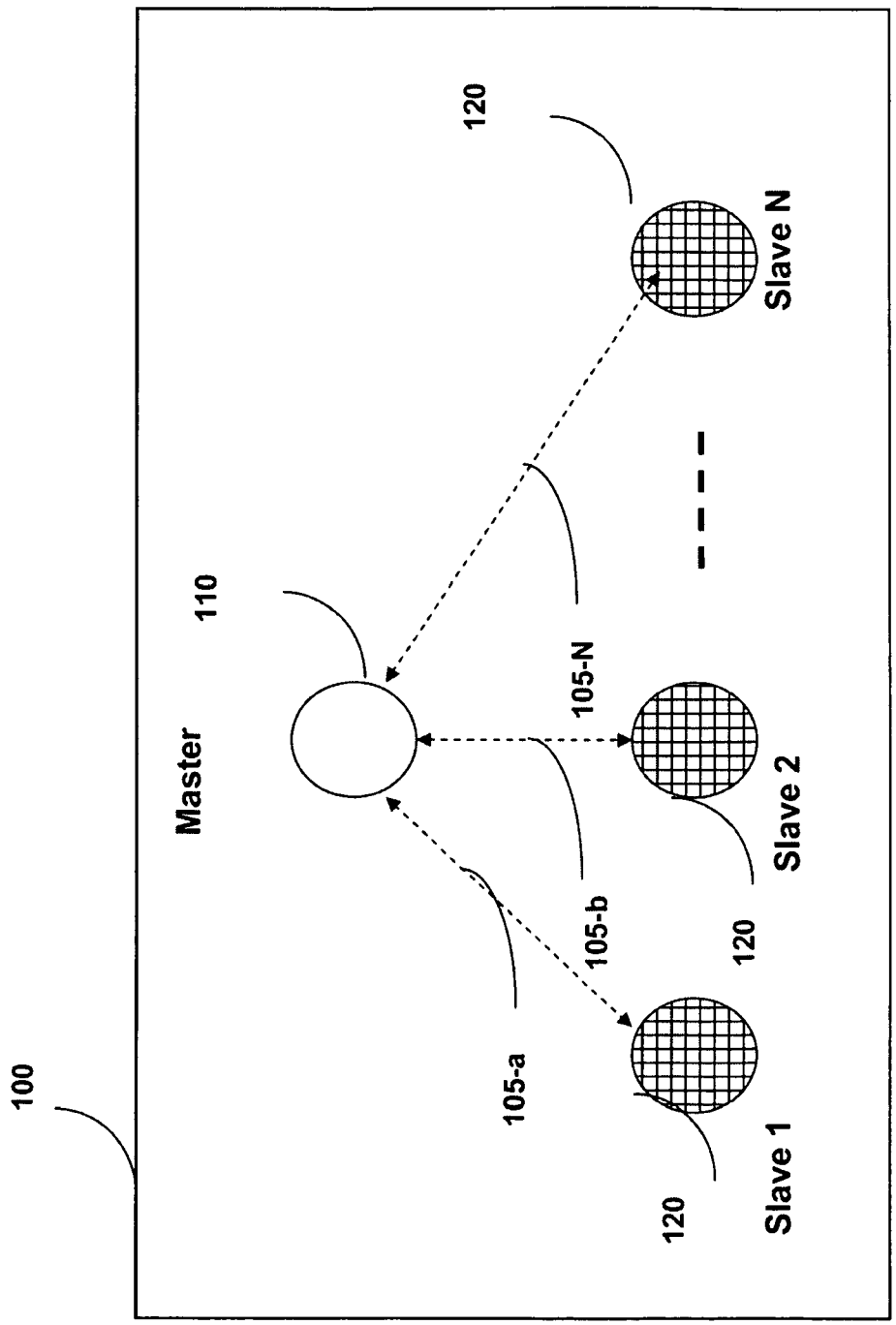
FIG. 1 is a schematic of a star network 100 including one master node and N number of slave nodes according to embodiments of the invention.

FIG. 1 shows the network topology described in the related application. A communication network 100 according to embodiments of the invention includes a master node (master) 110 and a set of N slave nodes (slaves) 120. The master 110 is the coordinator of all communications on wireless links (channels) 105, and each slave has an identity (ID). The links 105a-105N between the master and the slaves 120 are symmetrical. In other words, if the master 120 can transmit successfully to a slave 120, then slave 120 can also transmit successfully to the master 110. Therefore, each node includes a wireless transceiver (transmitter and receiver).

Figure 2:
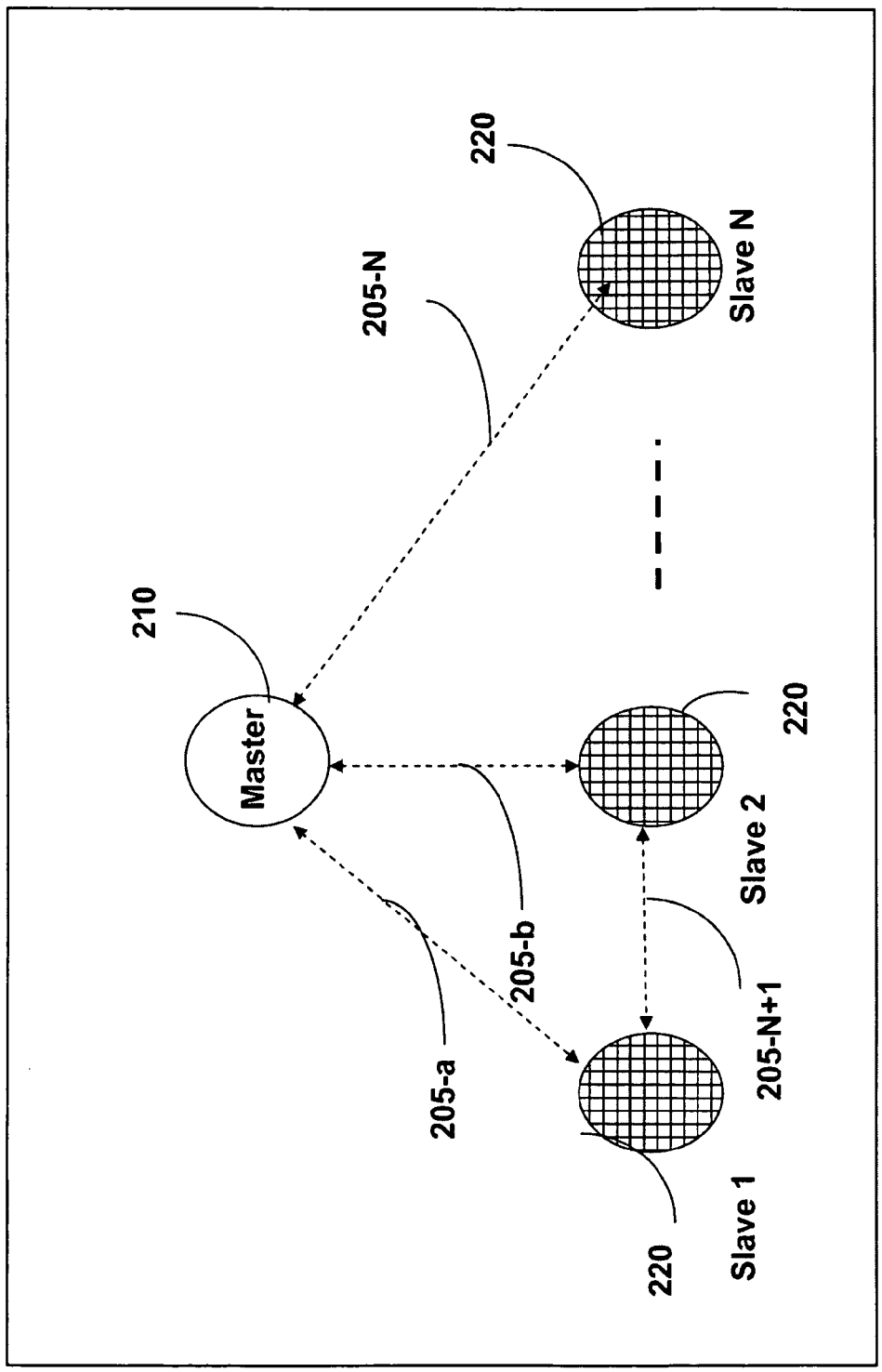
FIG. 2 is a schematic of a revised star network 200 including one master node and N number of slave nodes and allowing direct communications between slaves according to embodiments of the invention.

FIG. 2 shows the network topology when cooperation is enabled. The communication network still includes a master node (master) and a set of N slave nodes (slaves). The master transmit to and receive from the slaves directly (205a, 205b, ..., 205N). In the meantime, slaves can also communicate directly with each other (205-N+1).

A method for communicating between the master and the slaves ensures that in each communication cycle, the master 110 obtains a copy of sensor data from all operational slaves 120.

Embodiments of the invention make the following assumptions:

1) All the slaves can transmit simultaneously, because they use orthogonal frequency resources. The resources the slaves use comprise one of the following:
   different frequency sub-carriers,
   different direct sequence spread spectrum codes (DSSS), or
   both of (a) and (b).
2) The master assigns each slave the communication resources the slave uses, including the number of sub-carriers, which sub-carriers to use and/or which DSSS code to use.

3) The transmissions from the slaves to the master are uplink transmissions.
4) The transmissions from the master to the slaves are downlink transmissions, which use all available communication resources, i.e., sub-carriers.
5) Downlink and uplink transmissions are separated via time-division multiple access. In other words, uplink and downlink transmissions are disjoint in the time domain.
6) Slaves can relay packets from master to the destination slave, or from the source slave to master. This is called relay link transmission.

Figure 3:
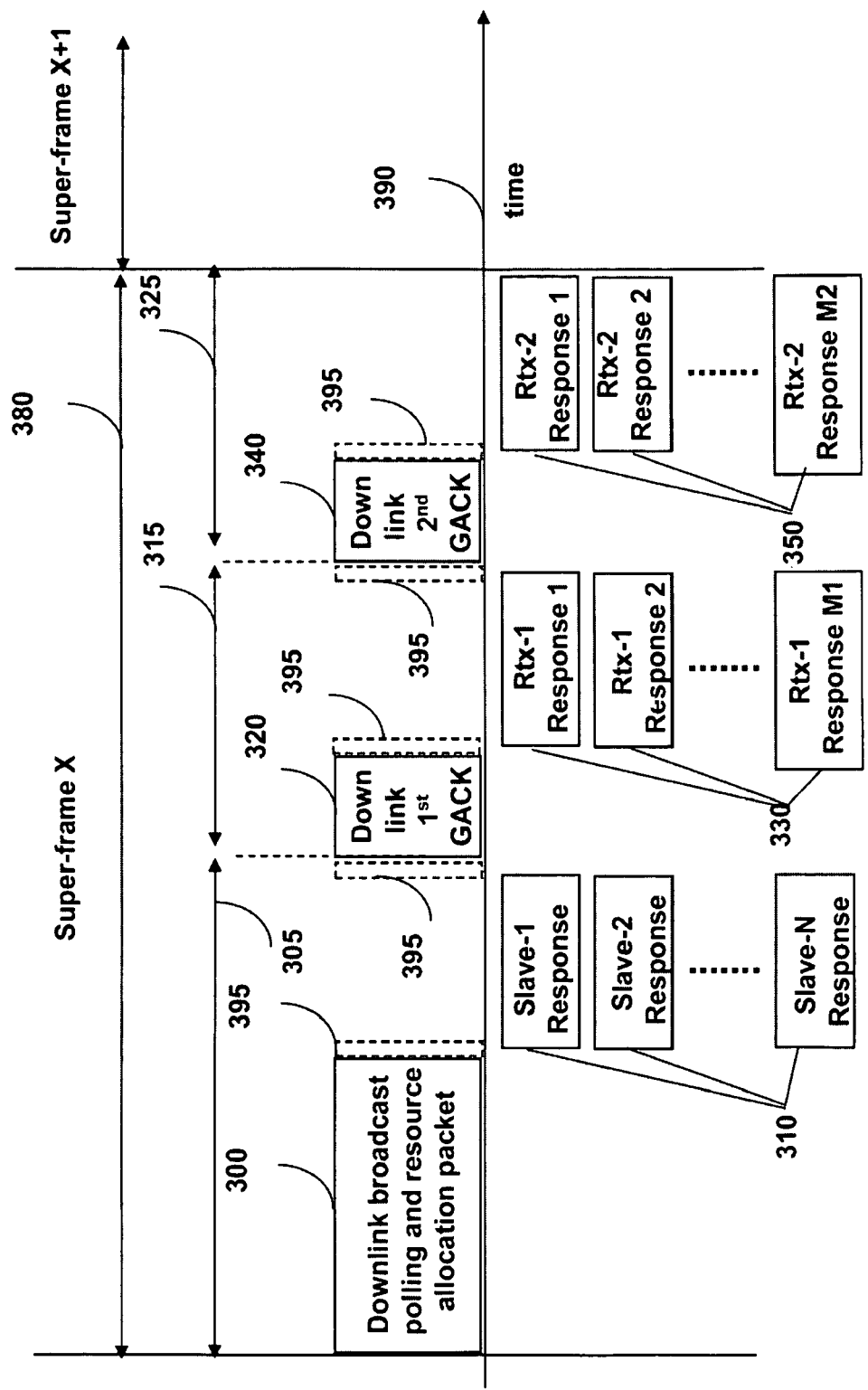
FIG. 3 is a block diagram of time division scheduling of downlink transmissions according to one embodiment of the invention.

According to the related application, a super-frame 380 comprises downlink and uplink transmissions within one communication cycle in the time domain 390. As illustrated in FIG. 3, the super-frame 380 in each cycle includes a maximum of three uplink transmissions and three downlink transmissions.

The downlink transmissions include a broadcast polling packet 300, a group acknowledgment packet (GACK-1) packet 320, and a GACK-2 packet 340. The uplink transmissions include slave responses 310, 1st slave response retransmission (Retx-1) packets 330, and $2^{nd}$ slave response retransmission (Retx-2) packets 350. The order of these six transmissions is: Broadcast polling packet 300, slave responses 310, GACK-1 packet 320, Retx-1 packets 330, GACK-2 packet 340, and Retx-2 packets 350, as shown in FIG. 3. Between two consecutive transmissions, there is a fixed time-interval called the turn around time 395, which enables the transceivers to switch between transmit mode and receive modes.

The super frame 380 starts with broadcasting of the downlink broadcast polling and resource allocation packet 300 by the master 210. This packet 300 is transmitted using communication resources, such that all the slaves can decode the packet successfully in an ideal channel case. For instance, in the case of a multi-carrier communication network, the broadcast polling packet 300 can use all the sub-carriers. Using all the resources for the downlink transmission increases the probability for its reliable reception by the slaves.

Relay Operation for Downlink Transmission

If a packet from the master to a slave k is lost in downlink transmission 300, the master will not receive acknowledgement or will receive a negative acknowledgement from slave k in Slave-k Response 310 and thus become aware of this transmission loss.

Meanwhile, other slaves (e.g., slave j, slave j+1, ... slave j+m) that are not the intended recipient can overhear the lost packet and can successfully decode the packet. These slaves can inform the master of this successful reception in their Slave Response 310.

The master then can select a slave or a set of slaves (e.g., slave j, slave j+1, ... slave j+p) that have successfully received the lost packet, and ask them to forward the overheard packet to the intended slave k. The master can inform these selected relay slaves in the downlink $1^{st}$ GACK of this forwarding request. In the downlink $1^{st}$ GACK, the master will also instruct slave k to receive in the Rtx-1 Response period.

In the Rtx-1 Response period, the selected slave or set of slaves forward the overheard packet to the intended slave k. The intended recipient slave k can combine the various received copies of the initial packet and attempt decoding again.

Slave k then can acknowledge in Rtx-2 Response whether or not this packet has been successfully received.

Alternatively, the master can retransmit the lost packet to slave k in downlink $1^{st}$ GACK.

Based on whether or not the master can receive an acknowledgement from slave k and other slaves in Rtx-1 Response, the master can decide whether or not the $1^{st}$ direct retransmission attempt is successful and who else have received this lost packet.

If the $1^{st}$ direct retransmission attempt fails, the master can instruct in Downlink $2^{nd}$ GACK the selected set of slaves to help forward the overheard packet to the intended recipient slave k.

The selected slaves forward the overheard packet to the intended recipient slave k in Rtx-2 Response period. The intended recipient slave k can combine the various received copies of the initial packet and attempt decoding again.

Relay Operation for Uplink Transmission

If a packet from slave k to the master is lost in Slave-k Response transmission 310, the master will notice that the packet it expects has not been received successfully.

The master can ask the failed slave in Downlink $1^{st}$ GACK period to retransmit its packet and it can also ask the successfully transmitted slaves to listen to the retransmission of the failed slave.

Those slaves that have successfully overheard the retransmitted packet originated from slave k can report to the master in the period of Rtx-2 Response.

The set of slaves that overheard the retransmission of the originally failed slave k then forward the overheard packet that originated from slave k to the master in the period of Rtx-2 Response. The master can combine the various received copies of the initial packet and attempt decoding again.

Channel Estimation for Relay Operation

In order to enable the master 210 to decide whether or not to use relay operation or not, the master 210 needs to know the channel state. Take master 210, slave 1 and slave 2 as an example. As shown in FIG. 2, master 210 can estimate the condition of channel 205-$a$ and 205-$b$ when it receives uplink transmission from slave 1 and slave 2, respectively. Since we assume the channel is symmetric, master 210 can use the estimate obtained in received uplink signal for corresponding downlink transmission.

For channel between a pair of slaves (e.g., slave 1 and slave 2), either one slave can listen and estimate the channel quality while the other is transmitting in uplink to the master. Then, either or both slaves can report the estimated quality for the channel between them to the master during their uplink transmission.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for communicating in a network including a master node (master) and a set of slave nodes (slaves), wherein the communicating uses orthogonal frequency-division multiplexing (OFDM) and time division multiple access (TDMA) symbols on sub-carriers, comprising:
   broadcasting during a first downlink transmission, from the master to the set of slaves using downlinks and all of the sub-carriers, a broadcast polling packet including data packets for each slave and sub-carrier assignments for the slaves;

transmitting simultaneously, from each slave to the master using uplinks and the assigned sub-carriers, a first response packet after receiving the broadcast polling packet; and broadcasting, from the master to the set of slave using the downlinks and all of the sub-carriers, a group acknowledgement packet, wherein the broadcast polling packet, the response packet, and the group acknowledgement packet comprise one superframe in one communication cycle, and wherein the broadcasting on the downlinks and the transmitting on the uplinks are disjoint in time.

2. The method of claim 1, wherein the slave that is an intended recipient of the data packets during the first downlink transmission reports to the master whether the response packet has been successfully received.

3. The method of claim 2, wherein the slave that is not an intended recipient of the data packets during the first downlink transmission reports to the master, if the slave has successfully received the group acknowledgement packet.

4. The method of claim 2, wherein the group acknowledgement can select a set of slaves that are not intended recipients of the data packets in the first downlink transmission but have successfully received the data packets in the first downlink transmission to act as relays, and instruct the selected slaves to forward the received data first downlink transmission to the intended slave.

5. The method of claim 2, wherein the superframe further comprises first retransmission data for slaves failing to respond to the broadcast polling packet, and first retransmission response packets corresponding to the first retransmission data, and the group acknowledgement packet for the first retransmission packet.

6. The method of claim 5, wherein the selected slaves forwards the received data packets during the first downlink transmission to the intended slave during the first retransmission response period.

7. The method of claim 6, wherein the intended slave recipient receives, during the first retransmission response period, if the master informs the slave to receive.

8. The method of claim 5, wherein the superframe further comprises second retransmission data for slaves failing to respond to the first retransmission data, and second retransmission response packets corresponding to the first retransmission data.

9. The method of claim 4, wherein the selected slaves forward the received data packets in the first downlink transmission to the intended slave recipient during the second retransmission response period.

10. The method of claim 6, wherein the intended slave recipient receives the intended data packet of the master from the relaying slaves during the second retransmission response period, if the master informs the slave to receive.

11. The method of claim 1, wherein the slave that is not an intended recipient of the data packets in the first response transmission reports to the master, if the slave has successfully received the data in the first response transmission.

12. The method of claim 1, wherein the group acknowledgement is used to report a set of slaves that are to act as relays for the failed slaves, and instruct the selected slaves to forward the received first retransmission response packet to the master in the second retransmission response interval.

13. The method of claim 5, wherein the selected slaves forward the received first retransmission response packet to the master in the second retransmission response interval.

14. The method of claim 1, slaves report to the master an estimated quality for a channel between the slave and peer slaves during the uplink transmission.

* * * * *